United States Patent [19]

Gardner

[11] Patent Number: 5,148,403
[45] Date of Patent: Sep. 15, 1992

[54] PRODUCTION OF PRERECORDED TAPE CASSETTES

[75] Inventor: John P. Gardner, Glos, United Kingdom

[73] Assignee: Sony Magnescale, Inc., Tokyo, Japan

[21] Appl. No.: 731,290

[22] Filed: Jul. 16, 1991

Related U.S. Application Data

[63] Continuation of Ser. No. 150,060, Jan. 29, 1988, abandoned.

[30] Foreign Application Priority Data

| Jan. 29, 1987 | [GB] | United Kingdom | 8701983 |
| Sep. 10, 1987 | [GB] | United Kingdom | 8721314 |
| Nov. 20, 1987 | [GB] | United Kingdom | 8727275 |
| Dec. 24, 1987 | [GB] | United Kingdom | 8730168 |

[51] Int. Cl.$^5$ ............................................ G11B 3/86
[52] U.S. Cl. .................................................... 360/15
[58] Field of Search .......................................... 360/15

[56] References Cited

U.S. PATENT DOCUMENTS

| 2,976,372 | 3/1961 | Sampson | 179/100.2 |
| 3,072,753 | 1/1963 | Goldberg et al. | 179/100.2 |
| 3,298,006 | 1/1967 | Milenkovic et al. | 340/174.1 |
| 4,113,196 | 9/1978 | Rehklau | 242/56 R |
| 4,185,305 | 1/1980 | Perret et al. | 360/33 |
| 4,261,021 | 4/1981 | Titus | 360/79 |
| 4,377,111 | 3/1983 | Kincheloe et al. | 101/44 |
| 4,663,678 | 5/1987 | Blum | 360/72.2 |

FOREIGN PATENT DOCUMENTS

| 0078218 | 10/1982 | European Pat. Off. |
| 0166250 | 1/1986 | European Pat. Off. |
| 0192445 | 8/1986 | European Pat. Off. |
| 3309029 | 9/1984 | Fed. Rep. of Germany |
| 8503797 | 8/1985 | Fed. Rep. of Germany |
| 0078218 | 5/1983 | France |
| 55-108979 | 8/1980 | Japan |
| 58-224485 | 12/1983 | Japan |
| 59-215087 | 12/1984 | Japan |
| 60-93692 | 5/1985 | Japan |
| WO85/03797 | 8/1985 | PCT Int'l Appl. |
| 1321977 | 4/1973 | United Kingdom |
| 2004112 | 3/1979 | United Kingdom |
| 2014347 | 8/1979 | United Kingdom |
| 1566177 | 4/1980 | United Kingdom |
| 2146484 | 4/1985 | United Kingdom |
| 2150734 | 7/1985 | United Kingdom |
| 2155683 | 9/1985 | United Kingdom |

OTHER PUBLICATIONS

IEEE Transactions on Consumer Electronics, vol. CE-32, No. 3, Aug. 1986, pp. 433-440, IEEE, New York, U.S.; K. Odaka et al.: "Format of Pre-Recorded R-DAT Tape and Results of High Speed Duplication".

Journal of the Audio Engineering Society, vol. 29, No. 4, Apr. 1981, pp. 252-257, Audio Engineering Society, Inc., New York, U.S.; G. S. Carter: "A Real-Time Tape Duplication System".

Primary Examiner—Vincent P. Canney
Attorney, Agent, or Firm—Ross, Howison, Clapp & Korn

[57] ABSTRACT

Open spool reels (18) of magnetic tape (7) are recorded with a plurality of different programmes interspersed with recordings in a different form (typically as interruptions to the sync track), representing data information concerning the programme material and production history of the recording. The data (6) recorded on the tape (7) is read by a transducer (39) on a cassette loading machine (30) and used to control the operation of the loading machine, identifying the length of tape and the position on the tape where splices between the magnetic tape (7) and leader tape in cassette shells is to be made. The data (6) also controls a label printer (46) to produce a printed label, typically in bar code form, carrying information representing the programme material on the tape loaded into the cassette. This label is automatically applied to the cassette shell as part of the cassette loading operation so that each cassette is securely provided with external easily read information identifying the programme content thereby avoiding the necessity for individual playback of a tape to identify its programme content.

39 Claims, 5 Drawing Sheets

PRODUCTION OF PRERECORDED TAPE CASSETTES

This application is a continuation of application Ser. No. 150,060, filed Jan. 29, 1988 now abandoned.

This invention relates to a method and apparatus for recording and loading magnetic tape cassettes.

As used in this specification the term "magnetic tape cassette" will be understood to relate to an assembly comprising an enclosing casing or shell housing two spools wound with a length of magnetic tape. Such cassettes are widely known for use with audio or video equipment and also as a recording store of data for computers. Regardless of its intended function the magnetic tape carried on the spools is of substantially the same form, comprising a flexible supporting substrate on one face of which there is formed an oxide layer exhibiting specific magnetic properties. Currently, the most well known types of cassettes are the Phillips "compact" cassette for audio and data information and the JVC "VHS" cassette for video information.

Magnetic tape for use in such cassettes is manufactured in rolls many thousands of metres long sufficient to fill very many cassettes. This tape is wound into the plastic housings or shells to form cassettes using a special machine known as a cassette loader. The information to be stored on the magnetic tape may be recorded after the tape has been loaded into the cassettes ("in-cassette duplication") or may be recorded before loading into the cassettes ("reel-to-reel duplication"). If the tape is recorded before being loaded into cassettes this is usually achieved by recording the same programme repeatedly onto a length of tape sufficient to fill several cassettes, and then loading a length of the tape containing one programme into each of several cassettes sequentially. In order to ensure that the length of tape loaded into a cassette contains the whole of a programme (and in this context, the term "programme" will be understood to mean a complete set of use signals, be they video or audio signals for entertainment or education purposes, or data signals for operating a computer or serving as the working basis for computer operation) it is necessary to leave a certain unrecorded length of tape between the end of a recorded programme and the commencement of the next adjacent recorded programme. It has also been known to record identifiable "cue tones" at the beginning or end (or both) of the programme material so that the physical break in the tape can with certainty be made in such a way that it does not impinge on the recorded programme material. In this way, the loader can detect the correct point to complete one cassette and start the next.

In audio cassette production (and some data cassettes), programme material can be recorded at high speed in reel-to-reel recording machines having large-diameter reels of use tape, special machines having been developed for this purpose. Typically, magnetic use tape equivalent to about 30 to 40 C 60 cassettes is recorded in this way from a length of "master" tape on which the programme information has been recorded with high fidelity.

This arrangement inevitably means that audio cassette reel-to-reel recording equipment is somewhat bulky, a recording deck having a relatively large surface area in order to accommodate the supply spool and take-up spool in side-by-side relationship. In practice, this is a relatively minor disadvantage in a conventional audio context because of the high speed at which recording is effected. This is possible with audio signals because of their comparatively narrow bandwidth. Recording can thus be carried out at a very high speed without loss of recording quality. For example, recording may be carried out at from 32 to 128 times playback speed. This enables highly productive audio cassette recording operations to be set up with relatively few copier machines so that the size of the machines themselves is at least tolerable.

In video recording, however, the recorded signals are of much higher bandwidth so that recording of such signals cannot be carried out at high speed without serious loss of recording quality. Even a recording speed 50 per cent higher than playback speed will normally result in an unacceptable reduction in quality and in most cases the recording speed has to be equal to the retrieval or playback speed. Because of this relatively slow speed of recording, many more copier machines are needed for video copying than for audio recording; indeed it is not unknown for a single establishment to have several thousands of copiers operating at the same time. Video copiers having the same size as open reel audio copiers would require about 400 per cent more space than an in-cassette copier and this is totally unacceptable. The same applies to high bandwidth audio copying e.g. R-DAT and S-DAT format. Although there are the above described differences between the treatment of audio and video tape due to differences in the nature of the signals there is in practice no difference in the magnetic tape itself except that tape for video signals is wider in order to accommodate the inclined recording stripes recorded by the rotating tape heads of a video recorder or playback machine. For the above reasons, in-cassette copying of video tapes remained customary practice for many years. However, the method has always been regarded as unsatisfactory for a number of reasons. First, the process is labour intensive due to the requirement to change the cassette after each recording had been completed. Secondly, the mechanisms which handle the slave cassettes in the players are inherently complex and sufficiently prone to unreliable performance that they can give significant practical problems after a prolonged period of heavy use. Thirdly, since the players have to start and stop between recording each cassette, and since each cassette contains tape which may have come from different reels of varying quality, it is necessary to sample each one after the recording has been completed in order to ensure the recording process has proceeded correctly.

Finding a solution to the problems of existing video copiers has been the subject of much activity in the industry and machines which eliminate many of the above-enumerated problems are now available.

The Sony Sprinter system, for example, passes a master tape carrying a "mirror image" of the magnetic recording patterns in contact with a slave tape through a recording station at which the two tapes are pressed together with a magnetic field applied so that the mirror image magnetic pattern is transferred reversely. The two tapes are stationary relative to each other and thus both may be transported at high speed through the recording station. This speed facility reduces the space requirements for a particular production level relative to the large space which would otherwise be needed. Quality recording requires a very strongly recorded master tape which is difficult to produce, production requiring specialist expensive recording techniques, and the print-through recorder is also itself expensive to produce since video copiers for commercial cassette production operations represent a small market, whose supply involves the economic disadvantages of small scale production operations. However, quality of recording is obtainable at high speed and in a labour-saving manner, thus making the machine commercially desirable and used increasingly. The Tape Automation ETD system comprises a recording head for recording the programme material onto use tape, and a pair of independantly operative motors (for example stepping motors) for effecting rim drive of each of two non-cassette (open) spools which are in use mounted to the apparatus for rotation about a common axis in parallel juxtaposed planes of rotation, one such spool serving as a supply spool which in use discharges use tape to the recording head and the other such spool serving as a take-up spool to take up recorded tape issuing from the recording head. The stepper motors are operable subject to control means for detecting changes in speed of tape supply and take-up whereby the relative speed of driven rotation of the spools can be adjusted to equalize tape supply to and tape take-up from the recording head. The space requirements of the machine are no more than about 25 per cent more than for conventional in-cassette mass copiers, an acceptable increase in practice. The spools of tape used in this system are very large diameter unbraced spools, that is the tape is wound on a core without the guiding discs conventionally used on open reels. By winding the tape at the correct high tension such open spools can be made hard and effectively self-supporting. They are known as "pancake" spools for obvious reasons.

Although the above machines largely deal with many of the above-outlined problems, without loss of recording quality, they do impose very severe logistic and organisational problems in a manufacturing operation. In order to gain maximum benefit when using the pancake spools it is desirable to record the whole length of tape on a spool before removing it for winding. This is necessary in order to maintain an adequately light and sufficiently constant winding tension to keep the spool in shape. This can involve up to 48 hours between pancake spool changes. However, other constraints such as the ratio of playback machines (producing the recording signal from a master cassette) to video loaders and the average batch size required, mean that in order to fill a whole pancake spool with recorded programme material, it is sometimes necessary to record different programmes at different points along the length of tape on the pancake spool. For example, the situation may be as follows:

| | |
|---|---|
| Ratio of playback machines to recording machines | 500:1 |
| Average programme length | 90 minutes |
| Average batch required | 1000 |
| Length of tape in each pancake spool | 4000 m |
| Programmes/pancake spool | 29 approx |

It will be appreciated that all 500 recording machines will record the same programme material so that to produce a batch of 1000 will require a given programme to be played only twice by the master playback machine and recorded on two sucessive lengths of each spool. Since each pancake spool can record 29 programmes each will on average contain 14 or 15 different programmes each recorded twice. It will be appreciated that this situation, after only a short period of cassette winding, results in a number and variety of recorded cassettes such that unacceptable levels of operator supervision and intervention are called for if uncertainty as to the identity of programme material recorded on the various individual cassettes (which all appear visually identical from the outside) is to be avoided, and indeed if winding operations are to be conducted efficiently at all.

In the case of the Sony Springer system, each of, for example, ten pancake spools is recorded from the same programme material. However it is still very easy to lose track of the recording programme, which can lead to problems of identification similar to those just described. These problems often result in the necessity to play back each of a large number of recorded cassettes in order to establish what has been recorded on them.

The technical problem to which the present invention relates, therefore, is that of unambiguously and automatically identifying the programme material recorded on a length of tape to enable the programme content of a cassette containing such tape to be identified without the need to play back the tape.

According to one aspect of the invention, there is provided a method of recording magnetic tape for subsequent loading into cassettes, in which between signals representing the programme material recorded along sections of the tape there are recorded signals representing data related to and/or identifying the programme material and which, upon playback of the tape act to control a cassette loading machine and/or apparatus such as a label printer associated therewith.

Conveniently, signals representing the programme material and the data are recorded onto the magnetic tape by transporting the tape past a recording head or transducer at a recording station and in any event the programme material is preferably recorded from a master recording made on a recording medium (e.g. a master cassette) on which only the programme material is recorded (although, in fact, some of the data may also be recorded on the master). Alternatively, a master may first be sub-mastered to provide one or a plurality of sub-master recordings each used to record part of a very large number of programme copies onto magnetic tape on open or pancake spools, each sub-master having data encoded thereon to identify it as distinct from its parent and other sub-master(s).

Alternatively, the programme material may be recorded onto magnetic tape by transporting the said magnetic tape and a tape carrying a master recording of the programme material through a recording station including means for pressing the two tapes into close contact in an applied magnetic field to induce magnetic "print-through" of the recorded signal from the master recording tape onto the use tape.

In preferred embodiments of the invention, the magnetic tape is recorded with the programme material and data by transporting it through the recording station from an open supply spool to an open take-up spool.

According to a second aspect of the invention, there is provided a method of producing cassettes of magnetic tape recorded with programme material, comprising the steps of preparing a reel of tape having a plurality of lengths recorded with programme material intercalated with recorded signals representing data, transferring the reel to a cassette loader having a transducer responsive to the said recorded data signals, transporting tape into a cassette past the said transducer, controlling the operation of the tape transport in dependence on signals generated by the said transducer, and further controlling means for forming visible indicia representing the identity of the programme material recorded on the tape for application to the shell of the cassette.

The means for forming the visible indicia may comprise a label printer and the method may then include the step of automatically applying a label printed with indicia corresponding to the said data signals onto the shell of the cassette during winding of the length of tape recorded with the programme material to which the data relates or immediately thereafter.

In one embodiment the said means for forming visible indicia comprise means for directly marking or engraving the shell of the cassette being loaded during winding of the tape or immediately thereafter.

The data signals detected by the said transducer may include data representing the length of tape occupied by programme material to which the data relates, and the method includes the step of storing the data length signal after detection thereof, generating signals representing the displacement of tape during winding thereof, comparing the said displacement-representative signals with the said stored signals and initiating deceleration of the tape transport when there is a predetermined difference therebetween. The present invention also comprehends magnetic tape recorded along successive lengths thereof with first signals representing programme material and second signals representing data indentifying the recorded programme material and/or one or more characteristics of the recorded tape and/or its production, the said second signals acting to control the operation of a cassette loader and/or associated apparatus upon detection thereof by a transducer sensitive to the magnetic recording on the tape.

Preferably the said first signals are television signals and the said second signals are recorded on the tape in pulse code form.

These pulse code signals are preferably recorded on the tape as pulse width modulation of the signal recorded on the sync track of the video recording.

According to a further aspect, the present invention provides apparatus for producing recorded magnetic tape comprises means for generating programme signals, recording transducer means to which the said programme signals are fed, means for generating data signals to be supplied to the said recording transducer means, tape transport means for transporting the magnetic tape to be recorded past the said recording transducer means, and control means connected to the said programme signal generator and the said data signal generator and operative to control energization of the transducer means such that data signals and related programme signals are recorded in sequence along the tape.

The said recording transducer means may comprise a simple recording transducer or two separate transducers spaced along the path of the magnetic tape, one for recording signals representing programme material and one for recording signals representing data.

In a further aspect of the invention there is provided apparatus for producing cassettes of recorded magnetic tape comprising apparatus as defined above for producing successive recordings of programme material and data onto a length of magnetic tape, means for winding the tape onto open spools after recording, a transducer sensitive to the recorded data signals and operative to generate electrical control signals in response thereto, a cassette loader having a drive spindle engageable with a spool of a cassette to be loaded, drive means for the spindle, a control circuit operative to control the spindle drive means in accordance with electrical control signals received from the said sensor, and cassette identification means operative to provide visible indicia representative of the programme identified by the data signal.

In the preferred embodiment of the invention the said cassette identification means comprises a label printer operative to print labels bearing indicia determined by the said data signals, and there are further provided means for applying the labels to cassette shells before being ejected from the cassette loader.

The label printer may operate to produce indicia in the form of machine readable bar codes on the labels to be applied to the cassettes, in which case there are preferably provided means for reading the bar code labels and directing the cassettes to one of a plurality of label application stations at which preliminarily prepared labels from a stack thereof are applied to the cassettes. Alternatively, the bar codes are read by means which directs the cassettes to one of a plurality of packing stations or the bar codes are read and the cassettes sorted and directed to storage. Of course, read could be effected at a station and label selection effected thereat.

More generally, of course, the invention can be considered as a system for encoding serial binary data by asynchronous modulation of a regularly occurring event signal, in which the event signal is interrupted to encode the binary data and decoding of the interrupted event signal to regenerate the binary data is effected by determining the length of successive periods in which the event signal is interrupted and uninterrupted respectively.

The present invention can thus be considered to include a system for recording serial binary data onto a magnetic tape in the presence of a regular signal recorded thereon, in which the binary data is recorded as asynchronous interruptions of the regular signal. In this latter case, then, the regular signal is the synchronisation control signal recorded along the edge of a video tape and the interruptions are formed either by selective erasure of a previously recorded synchronisation control signal or by selective inhibition of the recording transducer by which the synchronisation control signal is recorded, and selective inhibition of the recording transducer may be effected by short-circuiting the recording transducer during the intervals for which the synchronisation control signal is to be interrupted.

One embodiment of the present invention will now be more particularly described, by way of example, with reference to the accompanying drawings, in which.

Figure 1:
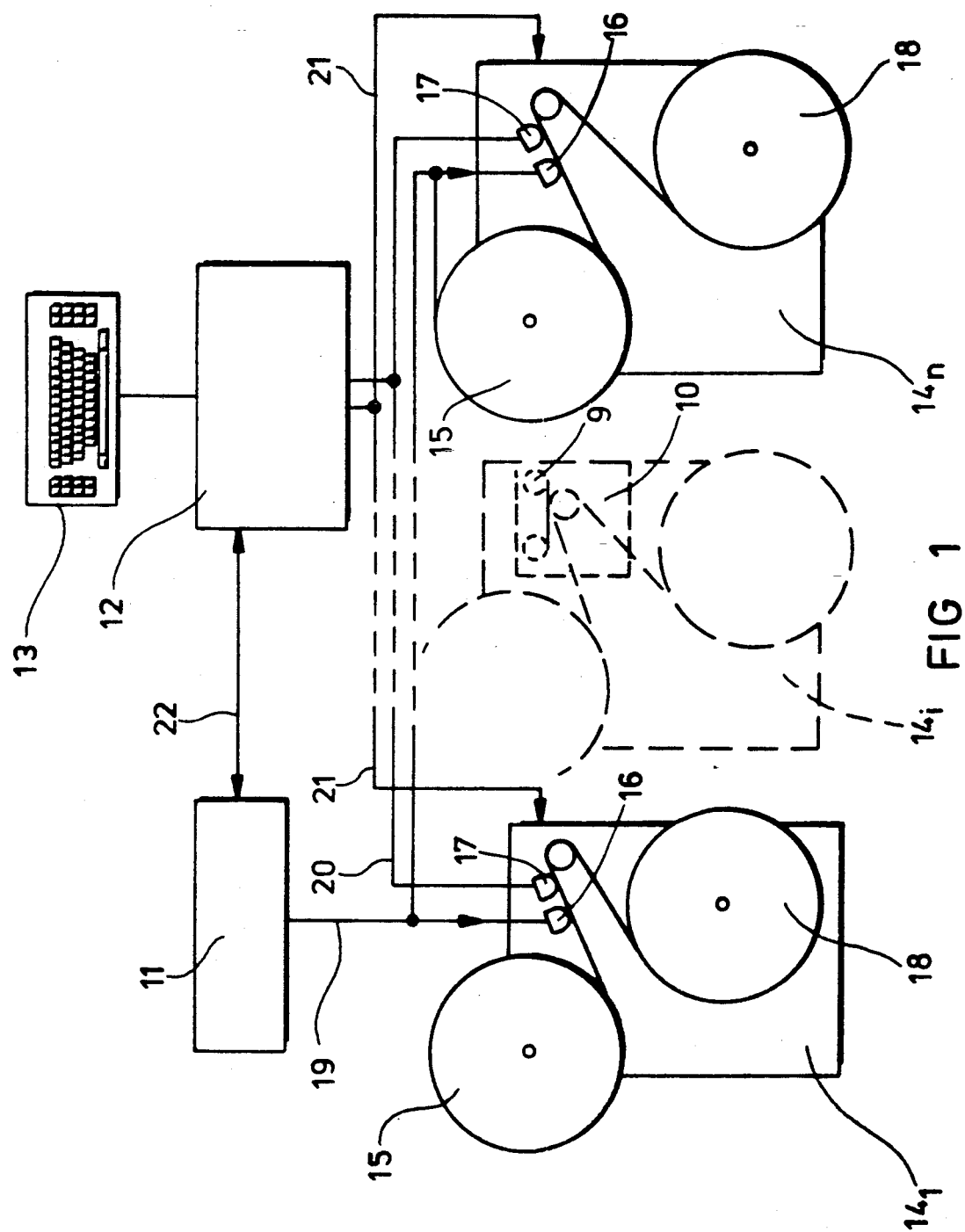
FIG. 1 is a diagram schematically showing apparatus for the production of recorded magnetic tape formed as an embodiment of the invention.

Referring now to FIG. 1, magnetic tape is recorded by a programme duplication assembly comprising a master playback machine 11, a main recording controller 12 having a keyboard 13 for inputting information, and a bank of tape recorders for recording the video output of the master playback machine 11 and the data output of the main recording controller 12. As can be seen in FIG. 1 the slave tape recorders, which are identified with the reference numeral $14_1$ to $14_n$ (where n, as mentioned above, may typically be 500 or in some cases may be 1000 or more) are equipped with drive means for carrying large open spools or pancake reels 15 from which tape is drawn over a capstan past two spaced recording heads 16, 17 onto a further open spool or pancake reel 18. The master playback machine is a conventional high quality video recorder, of the type generally available for domestic or professional use, modified so that video signals from a master programme cassette are output not to a VDU but to a programme output line 19 leading to the recording heads 16 of the recording machine $14_i$ to $14_n$ in parallel. The recording machines may have a construction and operation as described and illustrated in our co-pending U.S. patent application Ser. No. 092,327. As mentioned above, the bank of recorders 14 may comprise several hundred such recorders all receiving the same video signals derived from the master playback machine and the master cassette run thereon. Typically, about 500 recorders may be present in the bank. Each of the recording heads 17 is connected to a line 20 on which are applied data signals from the main recording controller 12, which in this embodiment comprises a suitably programmed interface computer. The computer also has a control output line 21 for conveying signals for controlling the production of "local" information derived directly from the individual recorders 14, such as a recorder identification code, which is thus recorded at appropriate points along the tape as controlled by the interface computer: this latter is also connected directly to the master playback machine 11 by a line 22 for the purpose of detecting the beginning and end of the programme material and for monitoring and/or controlling a pause period while the playback machine 11 rewinds for a subsequent run or while the cassette is replaced with another containing the same or a different program. In FIG. 1 a recording machine $14_i$ is shown with an alternative construction for recording by the so-called mirror image technique used in the Sony Sprinter device described hereinabove. In the recording machine $14_i$ a master tape 9 recorded with a mirror image signal is pressed into close contact with the recording tape at a recording station 10.

The interface computer 12 links the master playback machine 11 to the bank of recorders 14 and controls each production run on the basis of a production plan input to the computer via the keyboard 13 before the run is started (or afterwards and prior to playback of the master cassette to the end of the first master programme). Once a production run is complete, the computer prompts manual loading of the next master cassette and recycles. The signal control line 20 transmits global information output of the interface computer 12 to each recorder 14 in the recorder bank, the second line 21 being used to transmit trigger signals as discussed above.

Figure 2:
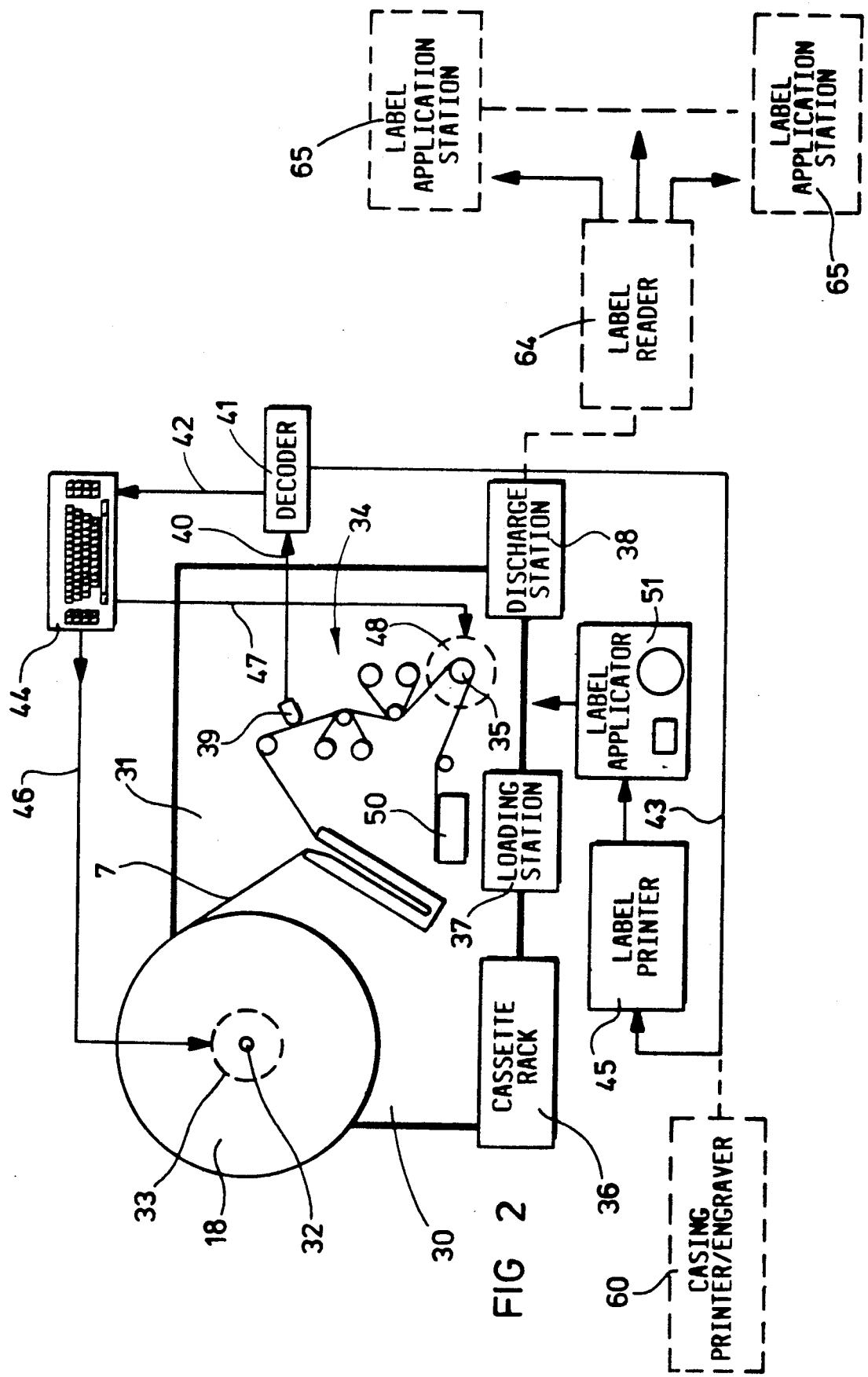
FIG. 2 is another diagram schematically illustrating a machine for producing recorded cassettes of magnetic tape from open spools or pancake reels of tape produced by the apparatus of FIG. 1.
Figure 3:
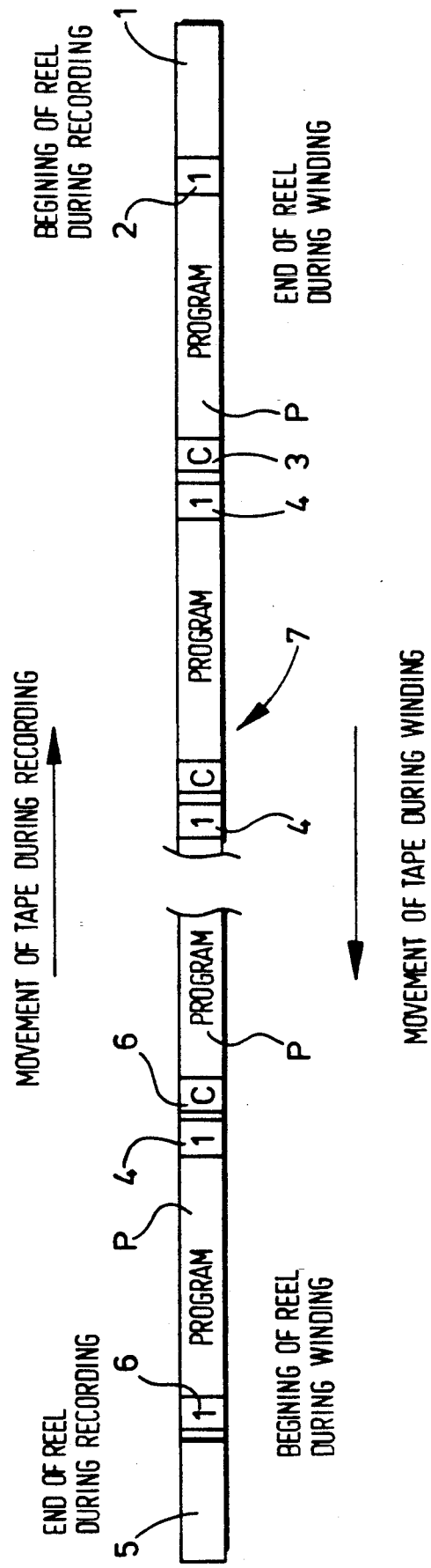
FIG. 3 is a diagram illustrating a length of magnetic tape recorded with video programme material data.

Turning now to FIG. 2, the cassette loading station comprises at least one cassette loader generally indicated 30, which in this embodiment is of the type described and illustrated in our co-pending U.S. patent application Ser. No. 890,078. The loader 30 is one of a plurality of such loaders the number of which will depend entirely on the number of recorders 14 in the bank of recorders, but due to the much faster speed of loading as compared to recording, the number of loaders 30 will be much less than the number of recorders 14 (typically one loader will be capable of loading the collective output of about 50 recorders). The loader 30 is adapted to receive an open spool or pancake reel 18 taken from a recorder 14 after having been recorded with a sequence of programme material and data signals in alternation in a pattern which will be more particularly described in relation to FIG. 3. This will include information for identifying the programme material recorded on the tape wound into the cassette and in practice certain other information. The data also includes an index "mark" or "cue tones" signifying one end of one set of signals representing programme material and the data signals.

Before proceeding to a detailed description of the loading station in FIG. 2, the format of the recording on the tape wound on the open spool or pancake reel 18 will be discussed.

First, it will be appreciated that because of the relatively large number of recorders 14 all receiving signals from the master playback machine 11, it is possible to produce a large number of copies of an original master tape relatively quickly. For example, by playing the tape in the master playback machine 11 only twice there will have been produced 1000 copies of the programme recorded thereon. Since the length of tape wound on a pancake reel can take very much more than this (typically in the region of 30 programmes) and because it is inefficient to slow down and stop the pancake reels once they have been set in motion, and even more inefficient to remove these from the recorder, place them on a loader and load only a fraction of the tape contained thereon before replacing it on a recorder and recording further information, it is normal practice to record the whole length of a pancake reel with a number of different programmes. For this reason it is assumed here that each pancake reel 18 after having been recorded will contain a plurality of different programmes, some of them repeated several times along the length of the tape. Because of slight differences between each of the recorders $14_i$ each pancake reel 18 so produced will have minor differences as concerns the precise physical length of tape used to record a given programme. In order to compensate this it is usual practice to leave a significant length of tape unrecorded in order to ensure that no programme from a relatively slow recorder $14_i$ is "cropped" during loading. It must be emphasized here that the differences in speed between one recorder and another are very small, typically less than 1 per cent, but on the other hand it must also be appreciated that the lengths of recording tape are extremely great, running into thousands of meters, and therefore even a very small percentage variation can result in quite significant physical differences in the position of a given programme along the tape.

The present invention, however, overcomes this disadvantage by means of the data control signals which are recorded on the tape during recording. As can be seen from FIG. 3 the tape of a recorded pancake has a number of programmes recorded thereon in sequence. The tape includes a short terminal length 1 used for threading the tape of the unrecorded pancake on the recorder. An index mark 2 recorded on the tape as an interruption in the video sync track after this length signifies the start of the tape carrying the first recorded programme. The following length of tape P is recorded with the programme. This is terminated by a length of tape 3 recorded serially with pulse coded information represented as a sequence of interruptions in the sync track of the video recording. A very short length of tape 4 then separates the code signals from another index mark signifying the beginning of the next length of tape recorded with programme material. This very short length is determined by the type of mastering system used in the recording procedure. If a single shuttle master is used, the very short tape length 4 represents the period during which the recorder is paused for the master cassette to rewind. If an alternating master system is employed, length 4 signifies a period inserted into procedures by the control system of the recorder to ensure inter-programme stability. The sequence index-programme-code-very short length is repeated to the end of the tape (the programmes being the same or different and the codes recorded after each programme representing the details of the programme just recorded, then a final code block 6 at the end of the tape is followed by a short terminal length 5 inserted by the interface computer to allow for handling during winding. The length 5 is left at the leading end of the first cassette to be loaded from the recorded pancake reel 18.

The coded information in the code block 3 and generated by the interface computer 12 is referred to as "global" information. The code block 3 also includes "local" information which is provided by the encoder forming part of the recorder 14 on which the particular pancake reel 18 has been recorded.

The index mark 2 and data 3 are recorded on the tape, as mentioned earlier, as pulses in the form of interruptions in the sync track of the video recording. The interruptions are caused by control line pulses of various length output from the interface computer. During loading of the open or 'pancake' reels into cassettes the tape is transported at many times the normal playback speed and it is essential that the signals which convey the coded information can be read with accuracy and consistency: the form of these signals, as will be discussed below, ensures that this can be achieved.

Figure 4:
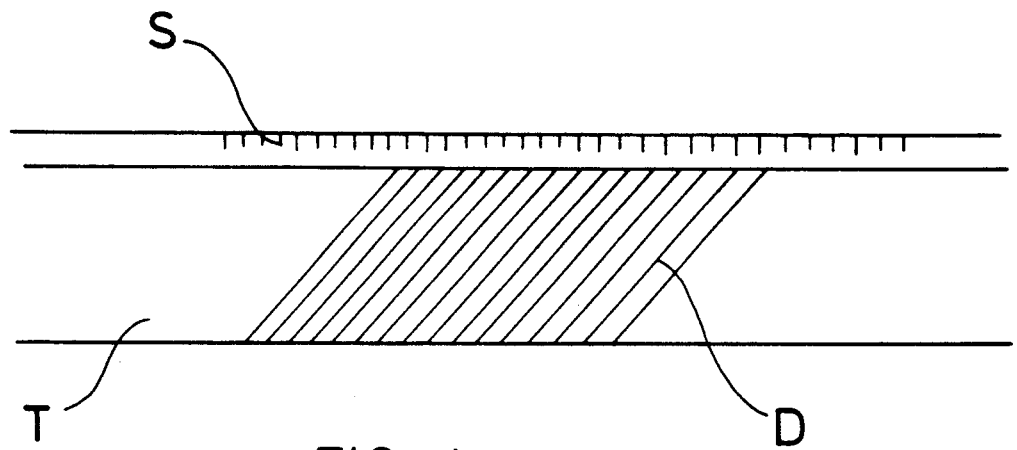
FIG. 4 is a diagram representing, on an enlarged scale, a part of the magnetic tape of FIG. 3 with a schematic indication of the signals recorded thereon.

First, as can be seen from FIG. 4, a magnetic video tape T is recorded with diagonal "stripes" D containing television picture signals comprising raster scan control signals and picture information: even in the so-called "grey" areas at the end of the programme recording the tape has such inclined stripes D containing the television raster scan control signals but no picture information. Likewise along one edge of the tape there is recorded a synchronisation signal S the function of which is to provide a reference signal for the operation of a video playback machine to enable it to compensate for minor variations in the speed at which its motors run in relation to the speed at which the tape was transported during recording. It is this sync track which makes it possible for a video tape to be played back successfully on different playback machines.

Figure 5:
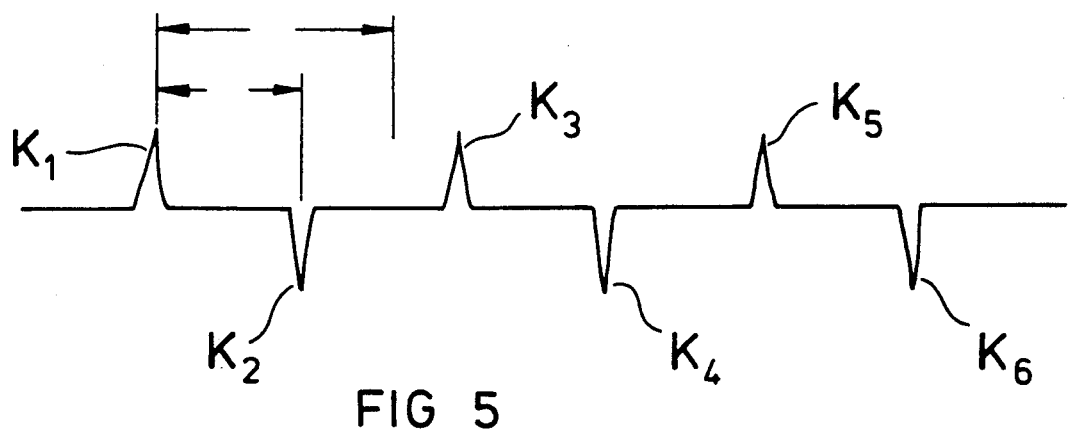
FIG. 5 is a schematic representation of a typical video synchronisation signal as recorded on or read from a magnetic video tape.

The form of the video sync track is illustrated in more detail with reference to FIG. 5. The synchronisation signal is recorded by successively applying a magnetising field across the video tape for a very short time period to cause saturation magnetisation first in one direction and then in the other. FIG. 5 may thus be considered as the form of an electrical signal applied to a recording transducer or one generated by a read transducer, or alternatively as a representation of the magnetisation state of the tape along its length. Successive similarly directed peaks K1, K3 etc. are spaced an equal distance apart and the time (when regarded as an electrical signal) or distance (when regarded as magnetisation of the tape) between adjacent peaks represents the time or distance between regularly occurring events. The problem which is addressed by the present invention is that the data signals which are to be recorded on the tape as selective interruptions of the synchronising pulse signal K1 occur in an entirely asynchronous manner and must therefore be equally valid and detectable whenever in the synchronisation pulse cycle the data signals should commence, bearing in mind that because the tape is being transported at high speed it is desirable to keep the length of tape occupied by the data code as short as possible. Decoding of the coded data is achieved by detecting the sync track of the tape as it is transported at high speed such as for loading and segmenting the encoded signal read from the tape into cells by reference to a stroboscopically generated decode clock signal which is synchronised with the tape movement so that its frequency is always uniquely related to the pulse repetition frequency of the sync track signal pulses K1. This may be achieved mechanically by means of a stroboscope wheel in the tape transport mechanism or by electrical or electronic means as appropriate. The sync track signal pulses K1 may be considered as events which, depending on the encoded signal which suppresses or erases certain pulses, may or may not occur in any given cell in the sequential series of cells into which the signal read from the sync track is segmented for the purpose of decoding. Sequential cells of the same sort (i.e. containing events or not containing events) are then accumulated in the hardware decoder and interpreted as either a binary 1 or a binary 0 depending on the number of sequential similar cells counted. For the purpose of decoding the signals it is necessary to define an "include period" as a period, measured in either time or distance (i.e. as a signal or as a recording on tape) for which the event is allowed to take place to form the code. Thus an include 0 period is a short include period, which upon decoding gives rise to a binary 0, whilst an include 1 is a long include period, which upon decoding gives rise to a binary 1.

Correspondingly it is necessary to define the concept of an "exclude period" as a period, again measured in either time or distance, for which the event is inhibited to form the code. In this case an "exclude 0" period is a short exclude period which, upon decoding gives rise to a binary 0, and an "exclude 1" period is a long exclude period which, upon decoding gives rise to a binary 1.

As mentioned above a cell or "length cell" is a period, measured in either time or distance, into which the encoded signal is segmented for decoding, and it is necessary to distinguish between a "full cell", namely a length cell containing an event, and an "empty cell" which is a length cell not containing an event.

In the case of VHS-format video tape, the control signal recorded down the edge of the tape, which is used as the event, has a different period for PAL from that for NTSC, but calculations may be made for both systems.

Depending on the tape production process one of two methods may be employed to create the include and exclude periods. The different effects of these two methods on the control track must be taken into account in the calcuations. The two methods are:

a. By selective erasure of an existing control track.
b. By selectively preventing the recording of the control track.

The actual method used depends on the type of tape copying system being used and at what stage the code is being introduced.

As applied to the recording methods discussed in detail in relation to FIGS. 1 and 2, the control pulses are prevented from being recorded by shorting out the control track record head to create the exclude periods. Control pulses are recorded by passing a DC current through the control track head first in one direction and then in the other. This creates short lengths of magnetic saturation along the tape first in one sense and then the other as described in relation to FIG. 5. The rapid change in flux during replay creates the control pulse. Shorting out the head leaves the tape unrecorded and the transition from saturated recording in either sense to no recording also creates a flux change in the replay head and thus a pulse. These extra pulses may be seen as an event by the decoder and must be taken into account in the calculations.

For calculation purposes upon decoding it is necessary to take into account the following:

Worst Case (Length)—The minimum include or exclude pulse length measured in time or distance required to produce a set number of full or empty length cells (EC or FC).

Worst Case (Cell count)—The maximum number of full or empty cells created by the Worst case (Length).

Best Case (Length)—The minimum include or exclude pulse length measured in time or distance which could produce a set number of full or empty cells. This must be calculated for include 1 and exclude 1 in order to establish an upper limit for include 0 and exclude 0.

Clearly the event period must be shorter than the length cell to guarantee that, when examining an include period, an event will be seen. Also both include and exclude 0 and include and exclude 1 must be longer than the length cell in order that a full or empty cell may be created.

In order to minimise the time or distance used by the code, a 0 may be considered as a minimum of 1 length cell (either full or empty). Since all the possible binary bit generators (include 0, include 1, exclude 0, exclude 1) are asynchronous to both the events and the length cells, more than one full or empty cell may be decoded having encoded a 0. Therefore, a 1 is defined as the minimum number of sequential full or empty cells sufficient to distinguish them from a 0.

In the exclude pulse worst case (ETD) an extra event is created at the beginning and end of the exclude pulse. Therefore the longest exclude pulse required to create empty cells occurs if the exclude pulse starts immediately after the beginning of a length cell. This first length cell must be decoded since full and sufficient time (distance) must be allowed for the exclude pulse to envelope this full cell plus the number of empty cells required. However, the minimum exclude pulse must be sufficient to envelope length cells at the maximum end of their tolerance band.

This can be expressed more succinctly if:
$E(min)$ = minimum exclude pulse period required
$EC$ = number of empty cells required
$LC(max)$ = longest possible length cell period
Then $$E(min) = (EC+1) * LC(max)$$

The event period is not relevant in exclude periods. In this worst case an extra full cell is added to the prior full cell count created by the previous include pulse.

The cell count worst case will occur in an encoding system which does not produce extra events at the beginning and end of an exclusion pulse. In this case it is possible for the exclusion pulse to occur up to one event period after the beginning of a length cell and the cell still be empty. This means the end of the exclusion pulse occurs at up to one event period after the end of the $(EC+1)$ length cell. If the end of the exclusion pulse occurs just after an event, then a further event period must take place before a full cell is registered. Therefore, if a length cell is less than twice the length of the event period, a further empty cell may occur making a maximum of $(EC+2)$ empty cells.

On the other hand the best case occurs when the length cell starts immediately after an event and the exclude pulse starts just before the next event coupled with the end of the exclude pulse occuring just after an event and the length cell ending just before the next event.

Now, given that the shortest exclude pulse will occur with the minimum event period and if
$E(min)$ = minimum exclude pulse period which could give rise to the specified number of empty cells
$EC$ = specified number of empty cells
$EV(min)$ = minimum event period
$LC(min)$ = minimum length cell period
Then:

$$E(min) = (EC * LC(min)) - (2 * EV(max))$$

The decoder has an event counter which is reset every length cell. Although this reset pulse is short, if it is coincident with an event the result will be indeterminate. Therefore in the "worst case" calculations at least two events must be specified.

This worst case will occur when the include pulse starts immediately after an event, resulting in an event period passing before the first full cell can be created and when the length cell ends immediately after an event with the include pulse ending just after the next event.

The length will be greatest when the event period as well as the length cell is greatest.
Thus if:
$1(min)$ = minimum include pulse period to ensure required number of full cells
$FC$ = required number of full cells
$LC(max)$ = maximum length of cell period
$EV(max)$ = maximum event period
We can write:

$$1(min) = ((FC-1) * LC(max)) + (2 * EV(max))$$

The cell count worst case occurs when the include pulse starts immediately before an event and is followed immediately by a length cell. The event included makes the previous cell full. From the worst case (Length), it can be seen that the include pulse may extend two event periods beyond the end of the penultimate length cell. This could give rise to a further full cell, that is a total of (FC+2).

The best case on the other hand occurs when the include pulse starts just before an event with the corresponding length cell having started just after the previous event, coupled with the penultimate length cell ending just before an event with the include pulse ending just after the same event. Here, the shortest include pulse will occur with the minimum event period.

Thus if:
l(min) = minimum include pulse period which could give rise to specified number of full cells
FC = specified number of full cells
LC(min) = minimum length cell period
EV(min) = minimum event period
Then:

$$l(min) = (int((FC-1)*LC(min))/(EV(min)))*EV(min)$$

When the encoded data is being recorded a short pulse (typically in the region of 1 sec) represents binary 0 during serial encoding of global information and a long pulse (typically in the region of 2 secs) represents binary 1 during serial encoding of global information, whilst a very long pulse (typically in the region of 4 secs) represents an index mark.

Computer-generated short and long pulses are used to make up global information, and also Local Information Clocks (LIC) to which the individual recorders respond by encoding, with similar pulses, the required local information to be recorded onto the tape. Each LIC triggers the recorder to encode one bit of local information and record it onto the tape, and contains timing information which controls the period of recorder-generated long and short pulses making up the local information codes.

Global information is output directly from the interface computer 11 along the control line 20. The second control line 21 is held inactive during global output on line 20.

The global information encoded as described above typically has the following composition.

Catalogue Number (for Programme Identification)

Catalogue number range—10 alphanumeric characters
Character range—From Ascii 32 to Ascii 95
Coding method:
The character range is thus 63. The coded value is calculated by deducting 32 from the Ascii value. The resulting number can be represented by a 6 bit word. Thus, the complete catalogue number is coded into eight 6 bit words i.e. 48 bits.

Programme Length

Length units—Meters
Length range—0–511 Meters
Coding method:
The programme length is converted directly into a 9 bit binary number.

Date

The date is coded in three parts:
1. Day of month
2. Month in year
3. Year
1. Range of days: 0–31
Coding method:
The day number is converted directly into a 5 bit binary number.
2. Range of months: 1–12
Coding method:
The month number is converted directly into a 4 bit binary number.
3. Range of years: 1986–2017
Coding method:
An equivalent year number is calculated by subtracting 1986 from the actual year. The range is thus reduced to 0–31. This is converted directly to a 5 bit number.

Time

The time is coded in two parts:
1. Hours
2. Minutes
1. Range of hours: 0–23
Coding method:
The hour number is converted directly into a 5 bit binary number.
2. Range of minutes: 0–59
Coding method:
The minutes number is converted directly into a 6 bit binary number.

The global information code sequence is thus as follows:

|  | Bit Count |
| --- | --- |
| Catalogue number | 48 |
| Programme length | 9 |
| Day | 5 |
| Month | 4 |
| Year | 5 |
| Hour | 5 |
| Minute | 6 |
| Note 1* | 6 |
| Total | 88 |

*Note 1 = Reserved for special use

Local information is encoded onto the tape by the recorder in response to LIC (Local Information Clock) pulses from the interface computer 11. Each LIC pulse is the simultaneous transmission of a long pulse on the main control line 20 used for global output (signifying binary 1) and a short pulse on the second control line 21 from the interface computer 11 (signifying binary 0). The leading edges of the pulses must be coincident to a tolerance of ±5 ms.

Local information has the following composition:

ETD Number (Identifying The Recorder)

Range of numbers: 0–1023
Coding method:
Direct conversion of EVD number to a 10 bit binary number.

Programme Number

Range of numbers 0–511
Coding method:
Direct Conversion to a 9 bit binary number.

The local information code sequence is thus as follow:

|  | Bit Count |
|---|---|
| EVD number | 10 |
| Programme number | 9 |
| Note 1* | 8 |
| Total | 27 |

Note 1* Reserved for special use. The following tabulated sequence represents an entire code block as recorded on the tape. The loading machine will of course read the sequence in reverse.

| BIT | Function |
|---|---|
| 1 | Catalogue Number (MSB 1st Character) |
| 48 | Catalogue number (LSB Last Character) |
| 49 | Programme length (MSB) |
| 57 | Programme length (LSB) |
| 58 | Day Number (MSB) |
| 62 | Day Number (MSB) |
| 63 | Month Number (MSB) |
| 66 | Month Number (LSB) |
| 67 | Year Number (MSB) |
| 71 | Year Number (LSB) |
| 72 | Hours Number (MSB) |
| 76 | Hours Number (LSB) |
| 77 | Minutes Number (MSB) |
| 82 | Minutes Number (LSB) |
| 83 | Reserved |
| 88 | Reserved |
| 89 | EVD Number (MSB) |
| 98 | EVD Number (LSB) |
| 99 | Programme Number (MSB) |
| 107 | Programme Number (LSB) |
| 108 | Reserved |

Referring back now to FIG. 2 the tape loader 30 is illustrated only in very schematic form for the purpose of the present description. A main support panel 31 carries a spindle 32 driven by a drive motor 33 (shown in broken outline in FIG. 2). Energisation of the motor 33 causes rotation of the spindle 32 and thus of the pancake reel 18 carried thereon to discharge recorded magnetic tape 7 through a path defined by a series of rollers generally indicated 34, including a capstan 35 to the spindle of which is fixed an optical encoder (not illustrated) in the form of a disc having an annular array of apertures with a light source on one side and a photo detector on the other for encoding the displacement of the tape as it is loaded into a cassette.

Empty cassette shells are stored on a rack 36 from where they are transported into a loading station 37 at which the tape 7 is introduced and loaded, and from the loading station 37 the, now filled, cassette is displaced to a discharge station 38. The manner in which the leader tape in the cassette shell is extracted, cut, spliced to the leading end of the magnetic tape 7, wound into the cassette shell, and the magnetic tape 7 cut and spliced to the free end of the leader tape, is described in our above-mentioned pending patent application and these mechanical operations form no part of the present invention which is directed to the manner in which these individual operations are controlled.

The tape guide rollers 34 guide the tape 7 past a magnetic read head or transducer 39 which is connected by a line 40 to a decoder 41 having output lines 42 and 43, the first of which leads to a central control panel 44 and the second of which leads to a bar code label printer 45.

The central control panel 44 has an output line 46 leading to the motor 33 driving the spindle 32 carrying the pancake reel 18, and an output line 47 leading to the motor 48 driving the capstan 35 which controls the displacement of the tape into the loading station 37 and is connected, as mentioned above, to the optical encoder for producing feedback signals representing the actual displacement of the tape.

The data signals recorded on the tape 7 thus control the operation of the machine loading the tape into the cassette shells and also the printing of bar code labels identifying the programme content and production history of the cassette itself. In operation, after the tape 7 has been threaded past the rollers 34 and the leading end placed on a splice block 50 at the loading station 37, the control unit 44 is operated, via a keyboard, to indicate to the system that a new pancake reel 18 has been placed in position and the capstan motor 48 and main reel drive motor 33 are placed on standby whilst the loader performs the first tape splicing operation, withdrawing a leader tape from the first cassette shell, cutting it, splicing one cut end to the leading end of the magnetic tape 7 and then passing a signal to the control unit 44 to indicate that the first splice has been successfully completed. The motors 48 and 33 are then energised, together with a further motor, not illustrated, which drives a spindle on which the hub of the spool within the cassette shell at the loading station is engaged so that magnetic tape 7 is unwound from the pancake reel 18 and wound onto the cassette at the loading station 37 after having passed the rollers 34. As the first code block 6 on the magnetic tape 7 passes the transducer 39 this reads the signals represented thereby and passes them along the line 40 to the decoder 41 which decodes the relevant sections and passes signals along the line 42 to the control unit 44 indicating the length of the programme recorded on the tape being wound into the cassette. The controller 44 compares this information with data coming from the encoder linked to the capstan 35 and, a predetermined time (or rather a predetermined distance) before the end of the programme starts to decelerate both the main reel drive motor 33 and the capstan 35 ready for the arrival of the first index mark 4 which will signify the end of the programme and, upon arrival, will cause the control unit 44 to stop the motors and initiates a tape splicing operation for cutting the tape at a point between the index mark 4 and the next code block 6 along the tape.

When the first code block 6 is read and the signals passed to the decoder 41 this also decodes the relevant information concerning the programme material and production history and signals representing these are passed along the line 43 to the label printer 45 which is thus energised to print a bar code label representing the data read from the tape. The label, after printing, is automatically passed to a label applicator 51 positioned closely adjacent the loading station 37, and is triggered to apply the label to the cassette shell either during loading of the tape 7 bearing the programme identified by the label just printed, or immediately after loading has been completed as the filled cassette is transferred from the loading station 37 to the discharge rack 38. Once the label has been successfully applied a signal is transmitted to the control unit 44 along a line (not illustrated) and the tape cassette loading cycle can recommence with the next length of tape 7. The cassettes from the discharge station may be passed to a label reader 64 from where the cassettes may be directed to one of a plurality of label application stations 65 at which preliminary prepared printed labels from a stack thereof may be applied to the cassettes.

Since the short length of blank tape between each index mark 4 and code block 6 is very short the transducer 39 will, in practice, read the subsequent code block 6 immediately after the index mark 4 and the data represented thereby will be decoded by the decoder 41 and stored in the short term buffer memory of the control unit 44 so that the necessary information for control of the next tape loading operation is already present immediately the confirmation signals from the tape splicing unit 50 and the labelled applicator 51 are received to allow the motors 33 and 48 to be re-energised to commence the next loading cycle.

Loaded cassettes bearing the bar code label identifying the tape recording on the magnetic tape contained in the cassette shell are then removed from the discharge rack 38 and fed to a sort line where the bar code labels can be automatically read and the cassettes directed to label applicator stations at which printed labels identifying the programme and containing, for example, advertising and other normal label material can be applied. The loaded cassettes can also be subjected to a quality control operation in which the data on the label, or data read again from the tape, is used to identify the recording history in the event of a faulty recording being found.

The apparatus of the present invention also allows recordings to be made on a speculative basis since the data concerning the programme material recorded on a pancake reel 18 is carried on the tape itself and it is possible to keep the recorders operating fulltime recording those programmes which it is anticipated will be in demand. The pancake reels 18 can be stored without being put into cassettes and withdrawn from store and loaded into cassettes when demand requires. If the demand for any particular programme material does not arise it is a simple matter magnetically to wipe the recording from the tape 7 and rerecord a new programme, something which is not convenient once the tape has been loaded into a cassette since this would require individual cassette recorders and, almost inevitably, either expensive automatic cassette recorder loading equipment or even more expensive labour.

Because of the nature of the data signals as interruptions in the video sync track the data recorded on each cassette cannot be copied by a conventional video cassette recorder and the presence of code blocks on a tape will therefore serve as a verification check on the authenticity of the programme recording.

It will be appreciated that data recorded on tape may be recorded as ordered magnetic domains or as randomised magnetic domains (e.g. an interruption in a control signal) and the expression "recorded" as used herein should be construed accordingly. The data will in general be provided by the interfaced computer linked to signal recording means but could merely be data recorded after completing the programme material recording of a pancake, for example, data encoded on the tape by winding machine and representing any one or more of the identity of the winding machine, the date of winding, cassette or cassette batch identity and/or any one or more items of other information.

Figure 6:
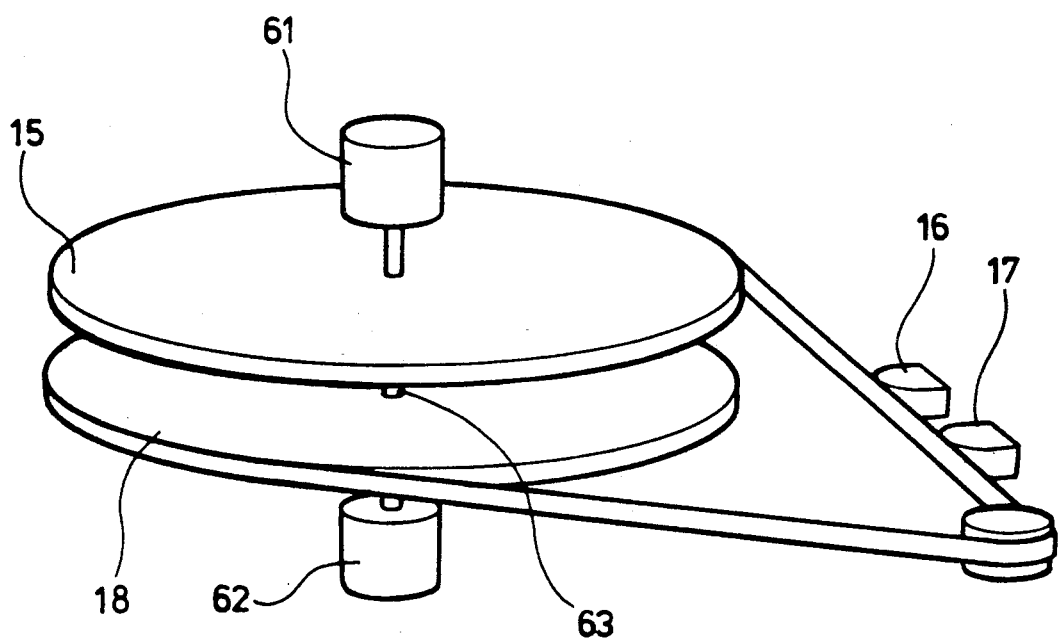
FIG. 6 illustrates an alternative reel mounting arrangement.

FIG. 6 shows the pancake reels 15, 18 mounted on a common spindle 63 and driven by separate motors 61, 62 (for which purpose the spindle 63 may be formed in two parts) to allow rotation of the reels 15, 18 at different speeds. The motors may, of course, be differently positioned, and the spindle 63 may be replaced by concentric shafts (not shown) comprising an outer hollow shaft driven by one motor and an inner shaft driven by or adjacent to the same end rather than at opposite ends of the spindle 63 as shown.

What is claimed is:

1. A method of recording magnetic video tape for subsequent loading into cassettes, comprising:
   transporting said video tape in a first tape transport direction,
   recording programme signals representing programme material along sections of tape while being transported in said first tape transport direction,
   recording data signals representing data related to said programme material along the synchronisation track of the said video tape immediately after recording the programme material to which said data signals relate, said data signals being recorded between successive said programme signals while said tape is being transported in said first tape transport direction, said data signals being in the form of asynchronous modulation of the regularly occurring video synchronisation signal of the video synchronisation track such that when said tape is transported in a tape transport direction opposite said first tape transport direction said data signals are detectable by transducer means to generate signals representative of said programme material recorded on the immediately following section of tape.

2. The method of claim 1, wherein said programme signals and said data signals are recorded onto said magnetic tape by transporting said tape past respective recording heads at a recording station and applying electrical signals to said recording heads whereby to generate varying magnetic patterns on said tape.

3. The method of claim 1, wherein:
   said programme signals are recorded onto said magnetic tape by transporting said tape and a tape carrying a mirror image master recording of the programme material through a recording station having means for pressing said two tapes into close contact in an applied magnetic field whereby to induce a reverse reproduction of the magnetic pattern on said master tape to be formed on said magnetic tape, and
   said data signals are recorded onto said magnetic tape by transporting said tape past a recording head and applying electrical signals thereto.

4. The method of claim 1, wherein said data signals are recorded on said magnetic tape in a digitally encoded recording pattern.

5. The method of claim 1, wherein said data signals are recorded as variable length absences in said video synchronization signal on said video sync track.

6. The method of claim 1, wherein said data signals are generated by a computer connected to signal recording means.

7. The method of claim 6, wherein said programme signals are recorded onto said tape and the end of said programme signals are detected to trigger the generation of said data signals, and wherein said data signals are recorded onto said tape on a portion of said tape following that on which said programme signals are recorded when said tape is transported in said first direction of tape transport.

8. The method of claim 1, wherein said data signals comprise at least data information signifying the identity of said programme.

9. The method of claim 1, wherein said data signals comprise at least data information representing the length of said tape occupied by said programme signals to which it relates.

10. The method of claim 1 further including the step of recording further coded data signals onto said tape signifying the number of individual programmes recorded on said tape between a leading end of said tape and the location of said further data signals.

11. A method of producing a cassette of pre-recorded magnetic tape, comprising the steps of:
preparing a reel of magnetic tape recorded with a plurality of sets of programme signals each set followed by a recording of data signals representative of at least one characteristic of a set of preceding programme signals recorded on said tape,
loading a length of said magnetic tape cut from said reel into a cassette so that said cassette contains tape recorded with at least one set of programme signals, and
machine reading the recorded data associated with a programme recorded on said length of tape, and
representing data machine-read from said tape as a visual display.

12. The method of claim 11, wherein said visual display representing said code is formed on said cassette shell.

13. The method of claim 11, wherein said visual display representing said code is formed as a remote display generated by remote display means.

14. The method claim of 11 wherein said at least one characteristic of a set of program signals recorded on said tape is one of:
the program identity,
the program history,
the program composition and
a program duration in units of time.

15. A method of producing cassettes of magnetic tape recorded with programme material, comprising the steps of:
preparing a reel of tape having a plurality of lengths recorded with programme signals intercalated with recorded data signals by transporting said video tape in a first tape transport direction, recording programme signals representing programme material along sections of tape while being transported in said first tape transport direction,
recording data signals representing data related to said programme material immediately after recording the programme material to which said data signals relate, with said data signals being recorded between successive said programme signals while said tape is being transported in said first tape transport direction, said data signals being in a form such that when said tape is transported in a tape transport direction opposite said first tape transport direction said data signals are detectable by transducer means to generate signals representative of said programme material recorded on the immediately following section of tape,
transferring said reel of tape to a cassette loader having a transducer responsive to said recorded data signals,
transporting tape into a cassette shell on said cassette loader past said transducer,
detecting said data signals with said transducer, and controlling the operation of said tape transport in dependence on signals generated by said transducer.

16. The method of claim 15, wherein said means for forming visible indicia comprise a label printer and said method includes the step of
applying a label printed with indicia corresponding to said data signals onto said cassette shell one of during winding of said length of tape recorded with said programme material to which said data signals relate and immediately after winding said length of tape.

17. The method of claim 15, wherein said means for forming visible indicia comprise
means for directly marking said cassette shell being loaded one of during winding of said tape and immediately thereafter.

18. The method of claim 17, wherein said step of directly marking said cassette shell comprises engraving indicia on said cassette shell.

19. The method of claim 17, wherein said data signals detected by said transducer include a data signal representing the length of tape occupied by programme material to which said data signals relate, and said method includes the step of:
storing said data length signal after detection thereof,
generating signals representing the displacement of said tape during winding thereof,
comparing said displacement-representative signals with said stored signals and,
initiating deceleration of said tape transport means when a predetermined difference is detected therebetween.

20. The method of claim 15, wherein said data signals include information identifying the recording means by which the said programme material is recorded onto said tape.

21. The method of claim 15, further including the step of:
recording a cue signal on said tape immediately prior to recording a length of tape with programme material and,
detecting said cue signal as tape is subsequently wound into a cassette whereby to control stopping of said tape transport means.

22. The method of claim 15, further including the step of controlling means for forming visible indicia representing the identity of the programme material recorded on said tape in dependence on signals generated by said transducer.

23. The method of claim 15, wherein said programme signals and said data signals are recorded onto said magnetic tape by transporting said tape past respective recording heads at a recording station and applying electrical signals to said recording heads whereby to generate varying magnetic patterns on said tape.

24. The method of claim 15, wherein:
said programme signals are recorded onto said magnetic tape by transporting said tape and a tape carrying a mirror image master recording of the programme material through a recording station having means for pressing said two tapes into close contact in an applied magnetic field whereby to induce a reverse reproduction of the magnetic pattern on said master tape to be formed on said magnetic tape, and said data signals are recorded onto said magnetic tape by transporting said tape past a recording head and applying electrical signals thereto.

25. The method of claim 15, wherein said data signals are recorded on said magnetic tape in a digitally encoded recording pattern.

26. The method of claim 15, wherein said data signals are recorded as variable length absences in said video synchronization signal on said video sync track.

27. The method of claim 15, wherein said data signals are generated by a computer connected to signal recording means.

28. The method of claim 15, wherein said data signals comprise at least data informatioin signifying the identity of said programme.

29. The method of claim 15, wherein said data signals comprise at least data information representing the length of said tape occupied by said programme signals to which it relates.

30. The method of claim 15, further including the step of recording further coded data signals onto said tape signifying the number of individual programmes recorded on said tape between a leading end of said tape and the location of said further data signals.

31. A method of producing recorded magnetic tape for subsequent loading into cassettes, comprising transporting said tape in a first tape transport direction, recording programme signals representing programme material along sections of tape while being transported in said first tape transport direction, recording data signals representing data related to said programme material immediately after recording the programme material to which said data signals relate, with said data signals being recorded between successive said programme signals while said tape is being transported in said first tape transport direction, said data signals being in a form such that when said tape is transported in a tape transport direction opposite said first tape transport direction said data signals are detectable by transducer means to generate signals representative of said programme material recorded on the immediately following section of tape, said data signals including information identifying the recording means by which said programme material is recorded onto said tape, and controlling the performance of a product sampling procedure on the basis of said recorded data signals, said product sampling procedure comprising the steps of:

testing the quality of a sample of said recorded programme material, determining the history of said sample from a display of information represented by said recorded data signals at least in the event of unsatisfactory results from said testing, and directing a subsequent investigation into materials and equipment used in the production of said sample under test on the basis of said displayed information.

32. Apparatus for producing cassette or recorded tape comprising:

means for generating program signals, recording transducer means, means for feeding said program signals to said recording transducer means, means for generating data signals, means for supplying said data signals to said recording transducer means, tape transport means for transporting magnetic tape to be recorded past said recording transducer means, and control means connected to said program signal generator and to said at a signal generator and operative to control energisation of said transducer means whereby to recorded data signals and related program signals in sequence along said tape, means for winding said tape onto open spools after recording, a transducer sensitive to said recorded data signals and operative to generate electrical signals in response thereto, cassette loading means having a cassette loading station, a cassette rack operable to deliver empty cassettes to said cassette loading station, and cassette identification means operative in response to said electrical signals generated by the said transducer to provide visible indicia representative of the program identified by the said data signal.

33. The apparatus of claim 32, wherein said recording transducer means comprise a programme transducer to which said programme signals are fed by said means for feeding programme signals, and a data transducer separate from said programme transducer to which said data signals are supplied by said means for supplying data signals, said two transducers being spaced along the path of said magnetic tape.

34. The apparatus of claim 33, wherein said data transducer is adapted to record along the video sync track of video tape.

35. The apparatus of claim 32, including means for mounting a non-cassette supply spool and a non-cassette take-up spool to the apparatus for rotation about a common axis in parallel juxtaposed planes of rotation, and means for effecting driven rotation of said spools so as in use to provide discharge of unrecorded use tape from said supply spool and take-up of recorded tape by said take-up spool.

36. The apparatus of claim 32, wherein said cassette identification means comprises a label printer operative to print labels bearing indicia determined by said data signals, and there are further provided means for applying said labels to said cassette shells before being ejected from said cassette loading means.

37. The apparatus of claim 36, wherein said label printer is operative to produce indicia in the form of machine readable bar codes on labels to be applied to said cassettes.

38. The apparatus of claim 37, wherein there are further provided means for reading said bar code labels and directing cassettes to one of a plurality of label application stations at which preliminarily prepared printed labels from a stack thereof are applied to said cassettes.

39. The apparatus of claim 32, wherein said cassette loading means further includes a control circuit operative to control said spindle drive means in accordance with signals received from said transducer.

* * * * *